April 12, 1966  R. E. STUEMKY ET AL  3,245,228
UNIVERSAL JOINT
Filed April 3, 1964  2 Sheets-Sheet 1
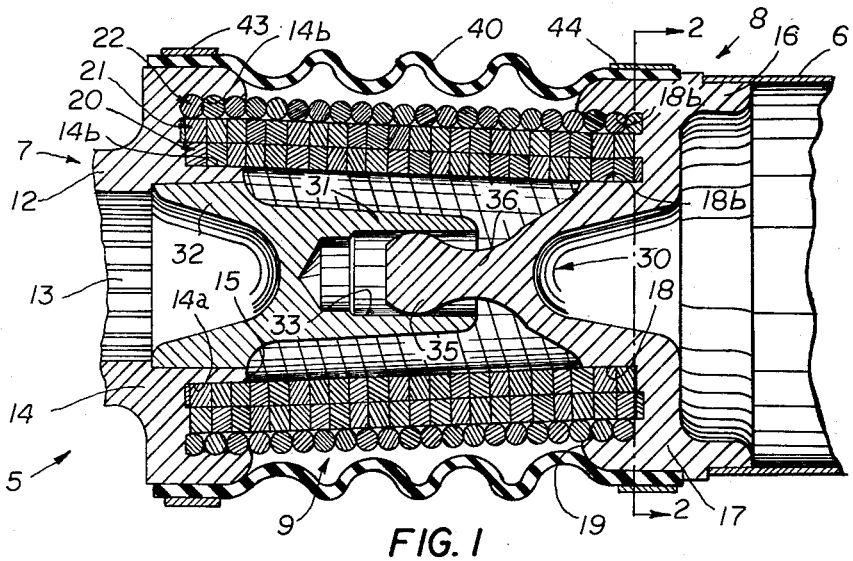
FIG. 1
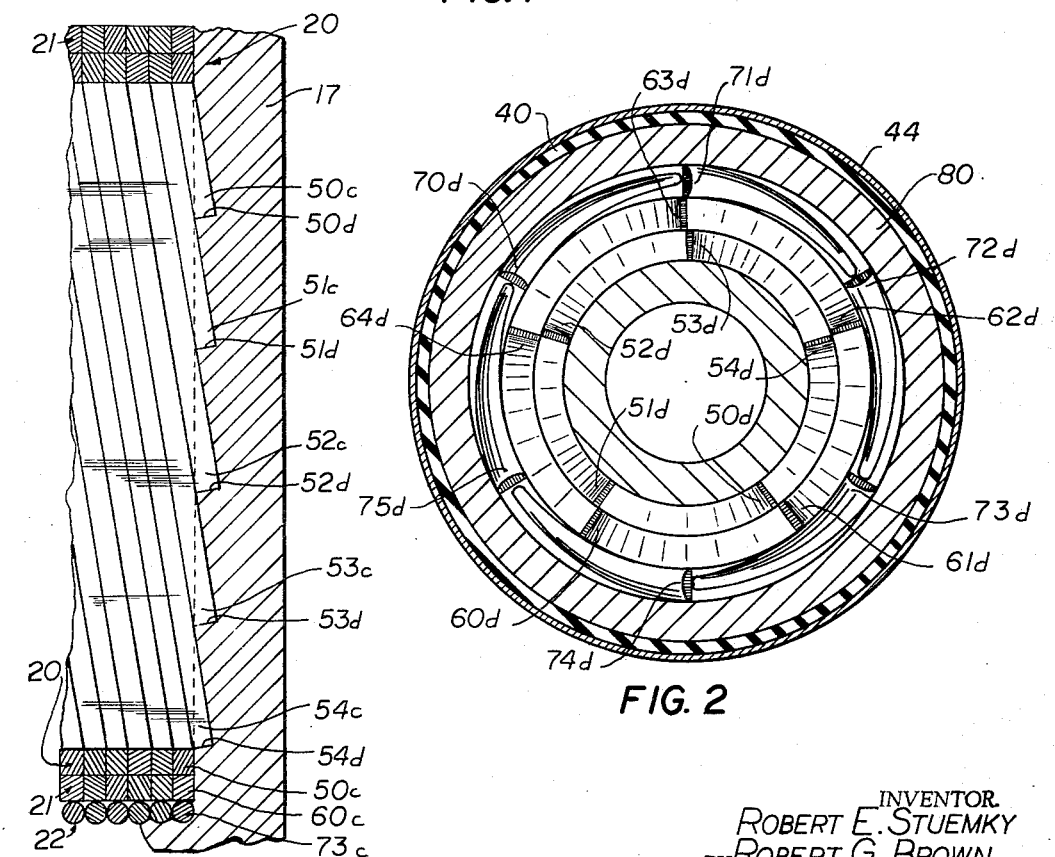
FIG. 9
FIG. 2
INVENTOR.
ROBERT E. STUEMKY
BY ROBERT G. BROWN
Williams, David,
Hoffmann + Yount
ATTORNEYS April 12, 1966  R. E. STUEMKY ET AL  3,245,228
UNIVERSAL JOINT
Filed April 3, 1964  2 Sheets-Sheet 2
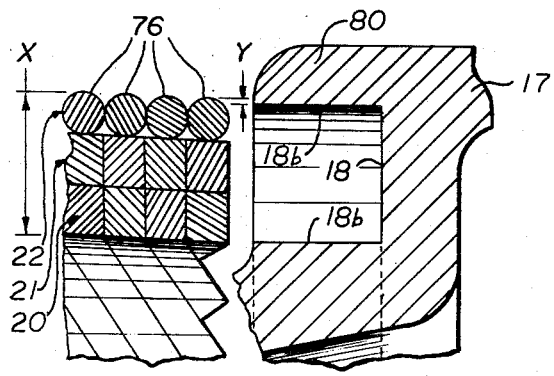
FIG. 6
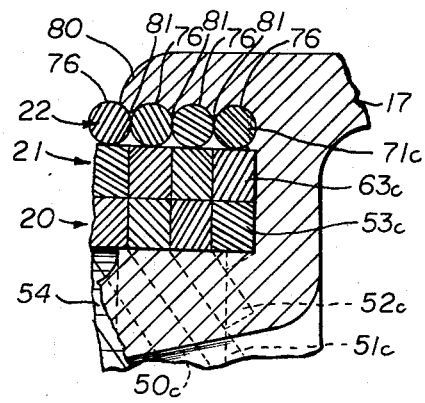
FIG. 7
FIG. 8
FIG. 3
FIG. 4
FIG. 5
FIG. 10
INVENTOR.
ROBERT E. STUEMKY
BY ROBERT G. BROWN
Williams, David,
Hoffmann & Yount
ATTORNEYS

United States Patent Office 3,245,228
Patented Apr. 12, 1966

3,245,228
UNIVERSAL JOINT
Robert E. Stuemky, Royal Oak, and Robert G. Brown, Birmingham, Mich., assignors to Eaton Manufacturing Company, Cleveland, Ohio, a corporation of Ohio
Filed Apr. 3, 1964, Ser. No. 357,216
19 Claims. (Cl. 64—15)

The present invention relates to flexible couplings and, particularly, to a universal joint of the spring type including spring means for transmitting torque between drive and driven members and to a method of making the same.

Prior art universal joints of the spring type utilizing spring means for transmitting torque between drive and driven members do not have a sufficiently high torque transmitting capability and often fail under high input torques. The known universal joints often fail due to the fact that the spring means is operatively connected to the driven and drive members in a manner which is unreliable and results in slippage under high torque or in a manner which deteriorates the fatigue strength of the wires as by welding or brazing.

Accordingly, the principal object of the present invention is the provision of a new and improved universal joint of the spring type wherein a spring means is connected to drive and driven members in a reliable simple and durable manner so as to provide a universal joint capable of transmitting extremely high torque without detrimentally affecting the physical properties of the wire of which the spring means is made.

Another important object of the present invention is the provision of a new and improved universal joint of the spring type and method of making the same wherein opposite ends of a spring means are press fitted into recesses in the drive and driven members, respectively, providing a press fit connection therewith.

A further object of the present invention is the provision of a new and improved flexible coupling of the spring type and method of making the same wherein spring means is press fit in recesses in drive and driven members to provide a press fit connection therewith and wherein the amount of interference between the spring means and the recesses, prior to their assembly, is greatly in excess of normal press fit practice and causes the drive and driven members to be placed in tension (hoop stress) and to clamp the ends of the spring means in their respective recesses and thereby provide a "clamp fit."

Another object of the present invention is the provision of a new and improved universal joint of the spring type having drive and driven members and spring means connected thereto for transmitting torque therebetween and wherein the connection of the spring members to the drive and driven members includes mechanically interfitting portions of the spring means and drive and driven members.

A still further object of the present invention is the provision of a new and improved universal joint of the spring type and method of making the same wherein opposite ends of a spring means are positioned in channel recesses in drive and driven members, respectively, and the spring means includes axially projecting portions which are embedded into the bottoms of the recesses upon insertion therein to thereby provide for a mechanical interfitting drive connection therebetween.

Still another object of the present invention is the provision of a new and improved universal joint of the spring type and a method making the same wherein spring means is press fitted into channel recesses in drive and driven members and the hardness of the spring means is greater than the hardness of the drive and driven members and as a result masses of material are formed in the recesses between the adjacent helices of the spring means.

Further objects and advantages of the present invention will be apparent to those skilled in the art to which it relates and the following detailed description of a preferred embodiment thereof made in reference to the accompanying drawings forming a part of this specification and in which:

FIG. 1 is a longitudinal axial sectional view of a flexible coupling embodying the present invention;

FIG. 2 is a transverse cross-sectional view of the flexible coupling shown in FIG. 1 and taken approximately along the section line 2—2 of FIG. 1;

FIGS. 3, 4 and 5 are similar views, partly in section, of different portions of the flexible coupling shown in FIG. 1;

FIG. 6 is a fragmentary sectional view on an enlarged scale showing a portion of the flexible coupling shown in FIG. 1 prior to assembly;

FIG. 7 is a fragmentary sectional view of a portion of the flexible coupling shown in FIG. 1 after assembly;

FIG. 8 is another fragmentary sectional view on an enlarged scale of a portion of the flexible coupling shown in FIG. 1;

FIG. 9 is a sectional developed view of a portion of the flexible coupling shown in FIG. 1; and FIG. 10 is a partial sectional view of a flexible coupling embodying the present invention but of modified construction.

The present invention relates to universal joints of the spring type and including spring means for transmitting torque between driving or drive and driven members. Primarily, such joints are used in vehicles and are associated with the drive shaft thereof. Often two universal joints are used at opposite ends of the drive shaft, namely, at the front and rear ends thereof. As is well known, however, these joints may be used in any environment to allow for universal pivotal movement of the driving and driven members relative to each other as well as transmit torque therebetween.

Referring now specifically to the drawings, the preferred embodiment of the present invention comprises a universal joint 5 of the spring type for use in association with a drive shaft 6 of an automobile. The universal joint 5 illustrated in the drawings is a front end joint and transmits torque from the transmission of the automobile, not shown, to the drive shaft 6. The joint 5 comprises a driving member 7 operatively connected to the transmission to be driven thereby and a driven member 8 adapted to be connected to the drive shaft 6. A spring means 9 is connected to the driving and driven members for transmitting torque therebetween in opposite directions.

The driving member 7 includes a hollow shaft portion 12 splined internally, as shown at 13, which splined portion cooperates with a driving member, not shown, driven from the transmission of the vehicle. The driving member 7 also includes a radially extending flange or end cap portion 14 formed integrally with the hollow shaft portion 12 and connected thereto at the end thereof remote from the transmission. The end cap portion 14 of the driving member 7 has an annular extending channel recess 14a therein concentric with the axis of the shaft portion 12 and intersecting the surface 15 of the end cap portion 14, which surface faces axially and toward the drive shaft 6.

The driven member 8 includes a shaft connecting portion 16 suitably fixedly connected to the drive shaft 6, and an end cap portion 17 having an annular extending recess 18 therein which is concentric with the axis of the drive shaft 6 and which intersects the surface 19 of the end cap portion 17, which surface faces axially toward surface 15 of the end cap portion 14 of the drive means 7. The recesses 14a and 18 have substantially the same radial extent and axial depth; however, the recess 18 is located radially inwardly of the recess 14a, for a purpose which will be apparent from the description hereinbelow. The radially spaced circumferentially extending walls 14b, 18b defining the recesses 14a and 18, respectively, extend axially from the base or bottom of the recesses.

The spring means 9 which transmits torque from the driving member 7 to the driven member 8 comprises a plurality of spring members of spring packs or units 20, 21 and 22. The spring members or units extend coaxially and are nested or telescoped together with the spring unit 20 being the inner unit, the spring unit 21 being the intermediate unit, and the spring unit 22 being the outer unit. The opposite ends of each of the spring units are suitably connected to the end cap portions 14 and 17 of the driving and driven members, respectively, so as to transmit torque therebetween. As viewed in FIG. 1, the left end portion of the spring units 20, 21 and 22 are positioned in the recess 14a, while the right end portions of the spring units are positioned in the recess 18. These end portions of the spring units 20, 21 and 22 are secured in the recesses 14a and 18, as will be described in detail hereinbelow.

The universal joint 5 further preferably includes a ball and tube construction 30 which supports the driving and driven members for universal relative pivotal movement therebetween and also provides for longitudinal axial relative movement between the driving and driven members. The ball and tube construction 30 comprises an axially extending tubular member 31 connected by an annular portion 32 with the end cap portion 14 of the driving means 7. The tubular member 31 has an axially extending passageway 33 therein.

The ball and tube construction 30 further includes a suitable spherically-shaped ball member 35 connected to the end cap portion 17 of the driven member 8 by means of an axially extending portion 36. The ball member 35 is slidably received in the passageway 33 of the tubular member 31 and is movable axially therein and is pivotal in a universal manner therein. From the above description, it can be seen that the driving member 7 and driven member 8 can pivot relatively in a universal manner and, moreover, can move relatively in an axial direction.

The universal joint 5 also includes a sleeve-like boot member 40 surrounding the spring units 20, 21 and 22. The boot member 40 functions to hold a lubricant in a surrounding relation to the spring units 20, 21 and 22, and to the ball and tube construction 30. The boot member 40 is made of a suitable rubber-like yieldable material and has a bellows-like portion intermediate its ends. The opposite ends of the sleeve member 40 are secured to the driving and driven members by suitable clamp members 43, 44, respectively. The bellows construction facilitates expansion and contraction of the sleeve member 40 in an axial direction upon relative movement of the driving and driven members in an axial direction. Moreover, the yieldable construction of the sleeve member 40 permits yielding thereof upon universal pivotal movement between the driving and driven members.

As noted above, the spring units 20, 21 and 22 transmit torque between the end cap portions 14 and 17, and each of the spring units has a truncated conical shape and comprises a plurality of individual spiral spring members. The inner spring unit 20 is preferably made up of five individual, open, wound left-hand spiral springs 50 to 54 having coils which are rectangular in cross section. The springs 50 to 54 are preferably wound so that the coils or helices thereof are spaced an axial distance equal to the axial cross-sectional dimension of the coils of the other springs. For example, the adjacent coils 50a and 50b of the spring 50 have an axial distance therebetween substantially equal to the sum of the axial dimensions of the cross section of one coil of the springs 51 to 54. The spring unit 20 is provided by assembling the springs 50 to 54 so that the coils thereof are interdigitated and in axial abutting relation, and therefore the spring unit 20 is in the form of a tapered cylinder member or truncated conical member. The ends of the individual springs 50 to 54, respectively, at the opposite ends of the spring unit 20 are not flush with the adjacent helix and thus provide axially projecting portions 50c to 54c at the opposite ends of the spring pack, the purpose of which will be described hereinbelow.

The intermediate spring unit 21 is preferably made up of five individual right-hand open-wound spiral spring members 60 to 64 having coils rectangular in cross section. The adjacent coils of the spring members 60 to 64 preferably are spaced apart in an axial direction a distance substantially equal to the sum of the axial dimensions of the cross section of the coils of other springs in the unit. For example, coil 60a of spring 60 is spaced from coil 60b a distance equal to the sum of the axial dimensions of the cross section of a coil of the other spring members, namely, equal to the sum of the axial cross-sectional dimension of a coil of the springs 61 to 64. The spring unit 21 is provided by assembling the springs 60 to 64 such that the coils of the individual springs are interdigitated and in axial abutment, and heretofore the spring unit 21 is in the form of a tapered cylinder member or truncated cone. The ends of the individual springs 60 to 64 at the opposite ends of the spring unit 21 are not flush with the adjacent helix and thus provide axially projecting portions 60c to 64c at the opposite ends of the spring unit, the purpose of which will be described hereinbelow.

The outer spring unit 22 is preferably made up of six individual open, wound, left-hand spiral coil springs 70 to 75 having coils of a uniform circular cross section. The individual coils of the open, wound springs 70 to 75 are spaced axially apart a distance substantially equal to the sum of the axial cross-sectional dimension of the other five spring members. For example, coil 71a is spaced from coil 71b of the spring 71 a distance equal to the sum of the axial cross-sectional dimensions of a coil of the other spring units. The spring unit 22 is provided by assembling the spring members 70 to 75 in an interdigitated axially abutting relation and is in the form of a tapered cylinder member or of a truncated cone. The ends of the individual springs 70 to 75 at the opposite ends of the spring unit 22 are not flush with the adjacent helix and thus provide axially projecting portions 70c to 75c, the purpose of which will be described hereinbelow. Moreover, since the individual coil springs 70 to 75 are arcuate or circular in cross section, the outermost circumferential portions thereof provide axially spaced radially projecting portions 76, the purpose of which will be described hereinbelow.

According to the present invention, the opposite ends of the spring means 9 comprising the spring units 20, 21 and 22 are connected to the driving and driven members in an extremely reliable and durable manner, and specifically are press fitted into the recesses 14a and 18 of the driving and driven members, respectively, and thus provide a press fit connection therebetween. This press fit is effected by cold pressing the spring means into the recesses by moving the spring means and driving and driven members relatively under pressure. The connection of the spring means 9 with the driving and driven members and the cooperative relationship between the spring means 9 and recesses 14a and 18 are identical and thus only the connection of the spring means 9 with the driven member 8 will be described in detail hereinbelow.

As noted above, the end of the spring means 9 is press fitted in the recess 18. The radial extent or width of the spring means 9, as indicated by the line X in FIG. 6, is substantially greater than the corresponding dimensions, namely, the width or radial extent of the recess 18. The difference in the width of the spring means and the corresponding dimension of the recess 18 is designated Y in FIG. 6 and is termed hereinbelow as the "interference" between the spring means and the recess. This intereference is substantially in excess of that which is normal in press fit practice and is substantially greater than that which is recommended by the well-known mechanical engineering texts.

The interference Y preferably, is of such a degree as to provide a so-called clamp fit. In the present example, the annular recess 18 is .010 to .030 inch narrower than the thickness of the spring pack which fits therein. For example, each groove or recess has a width of approximately .536 inch plus or minus suitable tolerance, and the spring pack has a width of .551 to .566 inch. The interference Y represents dimensionally 1.7 to 5.4 percent of the dimension X or radial extent of the spring means 9. Such a percentage of interference is greatly in excess of that recommended by Mark's Handbook even for shrink fits.

Due to the extremely great amount of interference between the spring unit 9 and the recess 18, when the spring pack is inserted into the recess 18, the outer portion 80 of the end cap 17 is greatly tensioned and as the spring pack moves toward the bottom of the recess 18, the entire end cap is tensioned, even the base portion thereof. As a result, the end cap applies a tight clamping pressure on the spring means 9 and tightly secures the spring means 9 in the recess 18 and this provides an extremely reliable and high-torque transmitting press fit connection between the spring packs and the end cap portion of the drive members. As the spring means is inserted in the recess 18 therein, a wedging action between the spring means and the walls of the recess takes place and the portion of the driving member at the base of the recess which is in tension applies an extremely great clamping pressure on the spring means and the walls of the recess 18 diverge. In view of this, particularly high-torque transmitting capacity is achieved by inserting the spring means 9 all the way into the recess or bottoming the spring means 9 in the recess 18.

Preferably, the hardness of the end caps is controlled within narrow limits and by maintaining the end caps at a lower hardness than that of the spring packs, even higher torque capacities are attained. By maintaining the end caps at a lower hardness than the spring packs, a mechanical interfitting of portions of the spring packs and the end cap is obtained which provides a direct and positive transmission of the torque from the end cap to the spring members in addition to the frictional gripping provided by the press fit described above.

With the end cap at a lower hardness than the spring packs as the spring units are inserted into the recess 18, the projecting portions 50c to 54c, 60c to 64c, and 70c to 75c are forced or embedded into the bottom surface of the recess 18. These portions of the spring units which are embedded in the bottom of the recess 18 provide for a mechanical interlocking or interfitting of the spring packs with the end caps and provide for a positive transmission or torque therebetween. As shown in FIG. 2, the end cap as a result of the embedding of the projecting portions of the springs thereinto, is provided with a plurality of grooves or step-like recesses 50d to 54d, 60d to 64d, and 70d to 75d in the bottom thereof which receive the projecting portions 50c to 54c, 60c to 64c and 70c to 75c, respectively, of the springs.

Moreover, because of the difference in the hardness of the springs and driven member, the clamping pressure acting radially of the spring units and tending to clamp the spring units in the recess 18 causes embedding of the projecting portions 76 and the spring unit 22 in the end cap and causes masses of material 81 to form between the adjacent helices of the outer spring unit 22 and, specifically, between the projecting portions 76 of the outer spring unit. Embedding of the portions 76 provides indentations in which the helices are received. The indentations receiving the projecting portions 76 of the springs in the spring pack prevent, to some extent, the spring pack from moving axially out of the recess 18, as well as providing a large area of frictional and mechanical engagement between the helices of the springs and the driven member and thereby providing a high-torque capacity, frictional and mechanical grip. As best shown in FIG. 6, the massing of the material is such as to provide different depth indentations from the open end of the recess to the bottom thereof. The massing of the material is greater at the bottom portion of the recess and, therefore, the groove adjacent to the bottom of the recess 18 is deeper than the other grooves and the amount of material massed between the helices is greater from the open end of the recess to the bottom thereof. In other words, the massing of the material becomes progressively less from the bottom of the recess 18 to the outer or open end thereof.

It should be apparent from the above description that, while the end caps are of a slightly less hardness than the spring units, the end caps cannot be too hard since the spring units will not be embedded into the end caps if they are too hard, but merely will tend to slide over the surface thereof and attain only a frictional hold therebetween. Of course, if the end cap is too soft relative to the spring units, the spring units will cut the material of the end caps and actually will shave the end caps and thus remove material therefrom and enlarge the recess 18. The relative hardness of the spring and end caps can readily be determined by those skilled in the art and for any given hardness of springs, the most desirable end cap hardness can be selected. Preferably, a hardness of 40–50 RC (Rockwell) for the springs and a hardness of 240–300 Brinell have been found acceptable.

From the above description, it should be readily apparent that the present invention provides a universal joint wherein the spring packs are securely gripped and held in the recesses in the end cap portions of the driving and driven members to provide an extremely high torque transmitting capability. This high torque carrying capability is provided by the clamp fit between the end cap portions and the spring units wherein the end cap portions of the driving and driven members are placed in tension substantially throughout so as to provide an extremely great frictional and mechanical gripping engagement with the spring means 9. Moreover, due to the hardness differences between the end cap portions and the springs, the bases of the recesses are indented by the axially projecting portions of the springs to provide a mechanical interconnection therebetween and the radial outermost surface of the recesses are provided with grooves or indentations which secure the spring packs against axial movement out of the end cap and provide for a large area of frictional contact between the outermost spring pack and the end cap. These factors, as outlined hereinabove, provide for a high-torque transmitting capacity and provide a greatly improved universal joint.

The modified flexible coupling embodying the present invention shown in FIG. 10 will be described hereinbelow and the same reference numerals used to designate parts of the flexible coupling shown in FIG. 1 will be used to designate the corresponding parts of the coupling of FIG. 10. The coupling shown in FIG. 10 comprises drive and driven members 7 and 8, respectively, and a spring means 9 connected to the drive and driven members for transmitting torque between the drive and driven members. The spring means 9 is comprised of a plurality of spring units 20, 21 and 22 which are of truncated shape and telescoped together. The opposite ends of the spring units are positioned in recesses 14a and 18 in the drive and driven members 7 and 8. The spring means 9 has a press-fit connection with the drive and driven members as described hereinabove with respect to the embodiment shown in FIG. 1.

The recesses 14a and 18 in the drive and driven members, respectively, extend at an angle to the axis of rotation of the coupling members and, specifically, at an angle which is the same as the angle or taper of the spring units relative to the axis of rotation of the coupling members due to their truncated shape. Thus, when the opposite ends of the spring means 9 are inserted into the recesses, the truncated configuration of the spring means will not be distorted and the frictional and mechanical interconnection between the spring means of the drive and driven members providing the press-fit interconnection therebetween is of extremely high torque transmitting capacity.

It should be further understood that the preferred embodiment of the present invention has been described hereinabove in great detail and that certain modifications, changes and adaptations therein may be made by those skilled in the art to which it relates and it is intended hereby to cover all such changes, adaptations, and modifications falling within the scope of the appended claims.

Having described our invention, we claim:

1. A flexible coupling comprising a drive member and a driven member, each of said drive and driven members having a channel recess therein defined by arcuate radially spaced surfaces having a maximum radial distance therebetween, spring means for transmitting torque between said drive and driven members, said spring means having opposite end portions having a uniform radial dimension greater than the maximum radial distance between said surfaces and positioned in said recesses and having a press fit connection with said drive and driven members.

2. A flexible coupling comprising a drive member and a driven member, each of said drive and driven members having a channel recess therein defined by arcuate radially spaced surfaces having a maximum radial distance therebetween, spring means for transmitting torque between said drive and driven members, said spring means including first and second spring sleeves in a telescoped relation with one spring sleeve positioned within the other, said spring means having opposite end portions having a uniform radial dimension greater than the maximum radial distance between said surfaces and positioned in said recesses and having a press fit connection with said drive and driven members with the inner radially spaced surface clamping the inner diameter of one spring sleeve along a portion of the length thereof and the outer radially spaced surface clamping the outer diameter of the outer spring sleeve along a portion of the length thereof.

3. A flexible coupling comprising a drive member and a driven member, each of said drive and driven members having a channel recess therein defined by arcuate radially spaced surfaces having a maximum radial distance therebetween, spring means for transmitting torque between said drive and driven members, said spring means including at least two spring sleeves of substantially equal lengths in a telescoped relation with one spring sleeve positioned within the other and extending coextensively therewith, each of said sleeves comprising a plurality of open wound springs with the coils thereof interdigitated, said spring means having opposite end portions having a substantially uniform radial dimension greater than the maximum radial distance between said surfaces and positioned in said recesses and having a press fit connection with said drive and driven members with the inner radially spaced surface clamping the inner diameter of the inner spring sleeve along a portion of the length thereof and the outer radially spaced surface clamping the outer diameter of the outer spring sleeve along a portion of the length thereof.

4. A flexible coupling comprising a drive member and a driven member, each of said drive and driven members having a channel recess therein defined by arcuate radially spaced surfaces having a maximum radial distance therebetween, spring means for transmitting torque between said drive and driven members, said spring means including inner and outer spring sleeves of substantially the same length in a telescoped relation with one spring sleeve positioned within the other and extending coextensively therewith, each of said sleeves comprising a plurality of spring members with the coils thereof interdigitated, the hardness of said spring means being substantially greater than the hardness of said drive and driven members, said spring means having opposite end portions having a substantially uniform radial dimension greater than the maximum radial distance between said surfaces and positioned in said recesses and having a press fit connection with said drive and driven members and with the inner radially spaced surface clamping the inner diameter of the inner spring sleeve along a portion of the length thereof and the outer radially spaced surface clamping the outer diameter of the outer spring sleeve along a portion of the length thereof.

5. A flexible coupling comprising a drive member and a driven member, each of said drive and driven members having a channel recess therein, spring means for transmitting torque between said drive and driven members and including a plurality of interdigitated springs forming a spring pack with the ends of each of the springs projecting axially from the helix of the adjacent spring, the hardness of said drive and driven members being less than the hardness of said springs, said spring means having opposite end portions united with said drive and driven members, respectively, and positioned in said recesses and having a press fit connection with said drive and driven members with the projecting ends of the springs embedded in the bottom of the recesses.

6. A flexible coupling comprising a drive member and a driven member, each of said drive and driven members having channel recesses therein defined by arcuate radially spaced surfaces having a maximum radial distance therebetween, spring means for transmitting torque between said drive and driven members and including a plurality of spring sleeves in a telescoped relation, the outer spring sleeve having radially outwardly projecting portions, the hardness of said drive and driven members being less than the hardness of said projecting portions of said spring sleeves, said spring means having its opposite end portions united with said drive and driven members respectively and having a substantially uniform radial dimension greater than the maximum radial distance between said surfaces and positioned in said recesses and having a press fit connection with said drive and driven members and with the inner radially spaced surface clamping the inner diameter of one spring sleeve along a portion of the length thereof and the outer radially spaced surface clamping the outer diameter of the outer spring sleeve along a portion of the length thereof with the radially extending portions thereof embedded in the outer surfaces of said recesses.

7. A flexible coupling comprising drive and driven members, each of said members having a channel recess therein, spring means for transmitting torque between said members and including a plurality of springs forming a spring pack and having radially extending portions and axially projecting portions, the hardness of said drive and driven members being less than the hardness of said spring means and said spring means having a press fit connection with said drive and driven members with the axially and radially projecting portions thereof embedded in adjacent surfaces of said recesses.

8. A flexible coupling as defined in claim 7 wherein said radially extending portions include axially spaced radially extending portions received in said recesses and said flexible coupling includes masses of material formed between said axially spaced radially extending portions which are formed therebetween.

9. A flexible coupling comprising a drive member and a driven member, each of said drive and driven members having a channel recess therein, spring means for transmitting torque between said drive and driven members, said spring means having opposite end portions united with said drive and driven members, respectively, positioned in said recesses and held therein by a clamping pressure applied thereto by said drive and driven members, said spring means having a truncated shaped and angularly related to the axis of rotation of said drive and driven members and said recesses being correspondingly angularly related to said axis of rotation.

10. A flexible coupling comprising a drive and a driven member, each of said drive and driven members having a channel recess therein defined by arcuate radially spaced surfaces having a substantially uniform distance therebetween, spring means for transmitting torque between said drive and driven members and having opposite end portions positioned in said recesses in said drive and driven members, respectively, and having a substantially uniform radial dimension greater than the radial distance between said surfaces and having an interference press-fit connection therebetween with the amount of interference between said spring means and said recesses being within the range of 1.7 to 5.4 percent of the dimension of the spring means.

11. A flexible coupling as defined in claim 10 wherein said drive and driven members are in tension and apply a clamping pressure to said spring means throughout the extent of the recesses.

12. A flexible coupling comprising a drive and a driven member, each of said drive and driven members having a channel recess therein, spring means for transmitting torque between said drive and driven members and having projecting portions extending axially therefrom and radially therefrom, the hardness of said drive and driven members being less than the hardness of said spring means, said spring means having an interference press fit connection with said drive and driven members and said projecting portions of said spring means extending into complementary recessed portions of said drive and driven members so as to provide a mechanical interconnection therebetween.

13. A method of making a flexible coupling having drive and driven members with recesses therein and spring means positioned in the recesses and for transmitting torque between the drive and driven members comprising the steps of positioning said spring means in alignment with the recesses in said drive and driven members, forcing the ends of said spring means into said recesses under pressure, and tensioning the portion of said drive and driven members having said recesses to effect a clamping pressure engagement between said drive and driven members and said spring means.

14. A method of assembling a flexible joint comprising providing a driven member having a channel recess therein, positioning, in alignment with said recess, a spring means having an interference with said recess of 1.7 to 5.4 percent of the dimension of said spring means, forcing said spring means into said recess, causing tensioning of the portion of said driven member having said recesses and thereby effecting a clamping engagement between said driven member and said spring means.

15. A method of making a flexible coupling comprising the steps of providing a driven member having a channel recess therein, positioning a spring means having a hardness greater than said driven member and an interference fit with said recess and axially projecting portions in alignment with said recess, forcing said spring means into said recess and embedding said axially projecting portions of said spring means into the bottom of said recess.

16. A method of making a flexible coupling comprising the steps of providing a driven member having a channel recess therein, positioning in alignment with said recess a spring means having a hardness greater than the hardness of said driven member and an interference fit with said recess and radially projecting portions, forcing said spring means into said recess, and forming indentations in the adjacent surface of said recess for receiving said radially projecting portions.

17. A method of making a flexible coupling as defined in claim 16 wherein said radially projecting portions include at least a pair of axially spaced radially projecting portions and further including the step of forming a mass of material between said adjacent radially projecting portions.

18. A method of making a flexible coupling comprising the steps of providing a driven member having a channel recess therein, positioning in alignment with said recess a spring means having a hardness greater than the hardness of the said driven member and an interference fit with said recess with said spring means including axially and radially extending portions, and embedding said axially and radially projecting portions of said spring means into said driven member upon movement of said spring means into said recess.

19. A flexible coupling comprising a drive member and a driven member, each of said drive and driven members having a channel recess therein defined by radially spaced surfaces having a maximum radial distance therebetween, spring means for transmitting torque between said drive and driven members, said spring means including at least an inner and outer spring sleeve in a telescoped relation with one spring sleeve positioned within another and extending coextensively therewith, each of said sleeves comprising a plurality of spring members with the coils thereof interdigitated, the hardness of said spring means being substantially greater than the hardness of said drive and driven members, said spring means having opposite end portions having radial dimensions greater than the maximum radial distance between said surfaces and positioned in said recesses and having a press-fit connection with said drive and driven members and with the inner radially spaced surfaces clamping the inner diameter of the inner spring sleeve along portions of the length thereof and the outer radially spaced surfaces clamping the outer diameter of the outer spring sleeve along portions of the length thereof.

References Cited by the Examiner

UNITED STATES PATENTS

| | | | |
|---|---|---|---|
| 350,631 | 10/1886 | Leaman | 64—150 |
| 1,429,146 | 9/1922 | Karge | 64—15 |
| 1,429,147 | 9/1922 | Karge | 64—15 |
| 1,471,488 | 10/1923 | Karge | 64—15 |
| 1,489,439 | 4/1924 | Karge | 64—15 |
| 1,505,596 | 8/1924 | Karge | 64—15 |
| 2,254,566 | 9/1941 | Cornell | 64—15 |
| 2,598,975 | 6/1952 | Coulter | 29—525 |
| 3,000,197 | 9/1961 | Ruegg et al. | 64—15 |

BROUGHTON G. DURHAM, *Primary Examiner.*

ROBERT C. RIORDON, *Examiner.*

H. C. COE, *Assistant Examiner.*